(12) United States Patent
Nogi et al.

(10) Patent No.: US 9,130,243 B2
(45) Date of Patent: Sep. 8, 2015

(54) NON-AQUEOUS ELECTROLYTIC SOLUTION AND LITHIUM SECONDARY BATTERY

(75) Inventors: Hidenobu Nogi, Chiba (JP); Akio Hiwara, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 728 days.

(21) Appl. No.: 13/057,306

(22) PCT Filed: Aug. 5, 2009

(86) PCT No.: PCT/JP2009/063873
§ 371 (c)(1),
(2), (4) Date: Feb. 3, 2011

(87) PCT Pub. No.: WO2010/016520
PCT Pub. Date: Feb. 11, 2010

(65) Prior Publication Data
US 2011/0136006 A1 Jun. 9, 2011

(30) Foreign Application Priority Data
Aug. 6, 2008 (JP) ................................ 2008-202863

(51) Int. Cl.
| | |
|---|---|
| *H01M 10/0566* | (2010.01) |
| *H01M 10/0525* | (2010.01) |
| *H01M 6/16* | (2006.01) |
| *H01M 10/0567* | (2010.01) |
| *H01M 10/0568* | (2010.01) |

(52) U.S. Cl.
CPC .......... *H01M 10/0566* (2013.01); *H01M 6/162* (2013.01); *H01M 6/168* (2013.01); *H01M 10/0525* (2013.01); *H01M 10/0567* (2013.01); *H01M 10/0568* (2013.01); *H01M 2300/004* (2013.01); *H01M 2300/0042* (2013.01); *Y02E 60/122* (2013.01)

(58) Field of Classification Search
CPC ..... H01M 4/505; H01M 4/583; H01M 4/405; H01M 6/168; H01M 10/0525; H01M 10/0567; H01M 2004/028; H01M 2300/0025; H01M 6/162; H01M 2300/004; H01M 2300/0042; Y02E 60/122
USPC ................. 429/340, 336, 329, 330, 341, 307, 429/231.1, 231.8; 252/62.2
See application file for complete search history.

(56) References Cited

U.S. PATENT DOCUMENTS

| | | |
|---|---|---|
| 7,491,471 B2 | 2/2009 | Yamaguchi et al. |
| 2001/0053485 A1 | 12/2001 | Shibuya et al. |
| 2003/0118914 A1 | 6/2003 | Mori |
| 2004/0034253 A1 | 2/2004 | Angell et al. |
| 2004/0197667 A1 | 10/2004 | Noh et al. |
| 2005/0014072 A1 | 1/2005 | Yamaguchi et al. |
| 2005/0214646 A1 | 9/2005 | Kubota |
| 2005/0287442 A1 | 12/2005 | Kim et al. |
| 2008/0145752 A1 | 6/2008 | Hirose et al. |
| 2008/0166637 A1 | 7/2008 | Inagaki et al. |
| 2009/0226808 A1 | 9/2009 | Hiwara |
| 2010/0018034 A1 | 1/2010 | Miyasaka et al. |
| 2010/0194347 A1 | 8/2010 | Kubota |

FOREIGN PATENT DOCUMENTS

| | | |
|---|---|---|
| JP | 11-339850 A | 12/1999 |
| JP | 3163078 B2 | 5/2001 |
| JP | 2002-329528 A | 11/2002 |
| JP | 7-240232 A | 5/2003 |
| JP | 2003-132946 A | 5/2003 |
| JP | 2003-151623 A | 5/2003 |
| JP | 2003-157900 A | 5/2003 |
| JP | 2004-47131 A | 2/2004 |
| JP | 2004-63145 A | 2/2004 |
| JP | 2004-071159 A | 3/2004 |
| JP | 2004-087168 A | 3/2004 |
| JP | 2004-171981 A | 6/2004 |
| JP | 2004-172101 A | 6/2004 |
| JP | 2004-342607 A | 12/2004 |
| JP | 2005-50808 A | 2/2005 |
| JP | 2005-100851 A | 4/2005 |
| JP | 2005-108440 A | 4/2005 |
| JP | 2005-235734 A | 9/2005 |
| JP | 2006-294519 A | 10/2006 |
| JP | 2007-165296 A | 6/2007 |
| JP | 2007-173113 A | 7/2007 |
| JP | 2007-207723 A | 8/2007 |
| WO | WO 2007/043624 | * 4/2007 |
| WO | WO 2007/043624 A1 | 4/2007 |
| WO | WO 2008/032657 A1 | 3/2008 |

OTHER PUBLICATIONS

International Search Report (PCT/ISA/210) issued on Nov. 2, 2009, by Japanese Patent Office as the International Searching Authority for International Application No. PCT/JP2009/063873.
Written Opinion (PCT/ISA/237) issued on Nov. 2, 2009, by Japanese Patent Office as the International Searching Authority for International Application No. PCT/JP2009/063873.
Extended European Search Report dated Feb. 25, 2013, issued by the European Patent Office in the corresponding European Application No. 09805003.2. (5 pages).
International Search Report (PCT/ISA/210) issued on Jan. 16, 2007, by the Japanese Patent Office as the International Searching Authority for International Patent Application No. PCT/JP2006/320410.
Written Opinion (PCT/ISA/237) issued on Jan. 16, 2007, by the Japanese Patent Office as the International Searching Authority for International Patent Application No. PCT/JP2006/320410.
Office Action issued Jul. 12, 2011 in Copending U.S. Appl. No. 12/083,005, filed Apr. 2, 2008.

(Continued)

*Primary Examiner* — Laura Weiner
(74) *Attorney, Agent, or Firm* — Buchanan, Ingersoll & Rooney PC

(57) ABSTRACT

The present invention provides a non-aqueous electrolytic solution for a lithium secondary battery, wherein the lithium secondary battery includes, as a cathode active material, a composite oxide in which at least 35% by mole of a transition metal included in the composite oxide is manganese, and wherein the non-aqueous electrolytic solution includes an unsaturated sultone.

2 Claims, 1 Drawing Sheet

(56) References Cited

OTHER PUBLICATIONS

Office Action issued Apr. 26, 2011 in Japanese Patent Application No. 2007-539986 and an English translation thereof.

Office Action issued in corresponding Korean Patent Application No. 10-2011-7003040 dated Jan. 25, 2013 with English translation.

Office Action (The Second Notification of Examination Opinion) issued by the Chinese Patent Office on Nov. 8, 2013, in corresponding Chinese Patent Application No. 200980130892.4 and an English translation of the Official Action. (7 pages).

* cited by examiner

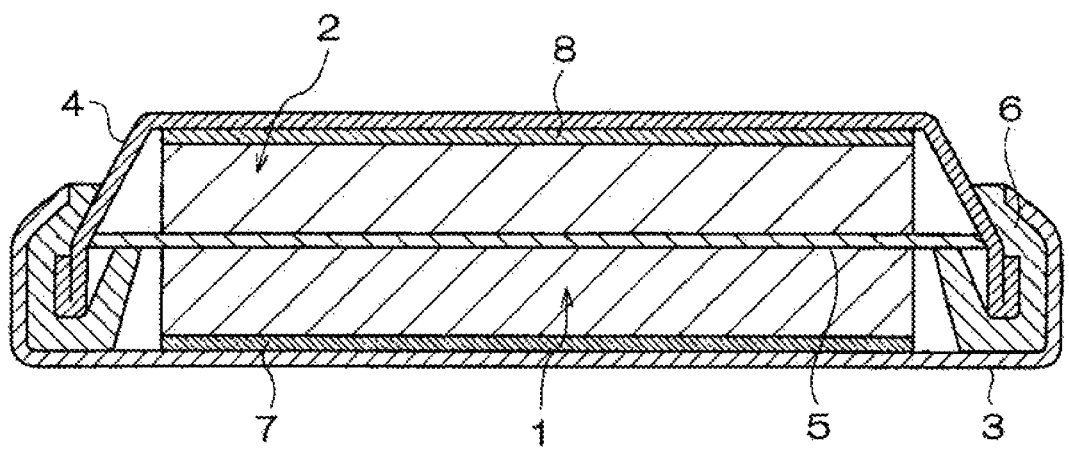

NON-AQUEOUS ELECTROLYTIC SOLUTION AND LITHIUM SECONDARY BATTERY

TECHNICAL FIELD

The present invention relates to a non-aqueous electrolytic solution and a lithium secondary battery.

RELATED ART

As a cathode active material for a lithium secondary battery, various active materials containing lithium and a transition metal are known. In many of the lithium secondary batteries which have been utilized in the past, the main component of the transition metal used as a cathode active material has been cobalt or nickel. The reason why cobalt and nickel have been widely used is that these metals make it easier to extend the life of the battery as compared with other transition metals.

However, cobalt and nickel, which have been conventionally widely used, are expensive and the resource thereof is limited. In view of a great increase in the demand for lithium secondary batteries in recent years and an expectation in the near future of a dramatic increase in the demand for large-size battery applications such as automobile applications and new energy-related storage applications, a shift from cobalt or nickel to the other transition metal cathode active materials, which are inexpensive and are abundant as resources, is strongly desired.

Among those, manganese, which is inexpensive and available in large amounts as compared with cobalt or nickel, is one of the promising next-generation cathode active material candidates. However, batteries using a manganese cathode generally have a shorter life than batteries using a cobalt or nickel cathode. On the other hand, one performance required in the market for large-size batteries, in which a dramatic increase in demand is expected in the near future, is extended battery life. Various technologies to meet this requirement have been investigated (see, for example, Japanese Patent Application Laid-Open (JP-A) No. 11-339850, Japanese Patent No. 3163078, and JP-A Nos. 2004-71159 and 2007-165296), but even greater improvement is still desired in terms of the performance required in the large-size battery market.

DISCLOSURE OF THE INVENTION

Problems to be Solved by the Invention

It is an object of the present invention to provide a non-aqueous electrolytic solution capable of realizing a lithium secondary battery having a long life and containing manganese as a cathode active material, and a lithium secondary battery using the non-aqueous electrolytic solution.

Means for Solving the Problems

The present inventors have made extensive studies on the above-described problems and, as a result, the inventors have discovered an electrolytic solution that can realize extension of the life of a lithium secondary battery that contains, as a cathode active material, manganese that is less expensive and available in greater amounts as compared with conventionally widely used cobalt or nickel; and a battery using the electrolytic solution, thereby completing the present invention.

Specifically, the present invention is as follows.

<1> A non-aqueous electrolytic solution for a lithium secondary battery, wherein:
the lithium secondary battery comprises, as a cathode active material, a composite oxide in which at least 35% by mole of a transition metal included in the composite oxide is manganese, and wherein:
the non-aqueous electrolytic solution comprises an unsaturated sultone.

<2> The non-aqueous electrolytic solution according to <1>, wherein the unsaturated sultone is represented by following Formula (1):

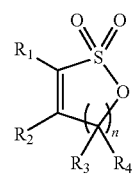

(1)

wherein, in Formula (1), $R_1$, $R_2$, $R_3$ and $R_4$ each independently represents a hydrogen atom, a fluorine atom, or a hydrocarbon group having 1 to 12 carbon atoms that can be substituted by a fluorine atom; and represents an integer of from 0 to 3.

<3> The non-aqueous electrolytic solution according to <2> or <1>, further comprising:
a fluorinated ethylene carbonate; or
vinylene carbonate, or a vinylene carbonate derivative, represented by following Formula (3):

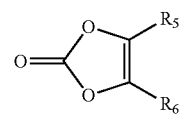

(3)

wherein, in Formula (3), $R_5$ and $R_6$ each independently represents a hydrogen atom, a methyl group, an ethyl group or a propyl group.

<4> The non-aqueous electrolytic solution according to any one of <1> to <3>, further comprising a silyl phosphate derivative represented by following Formula (4):

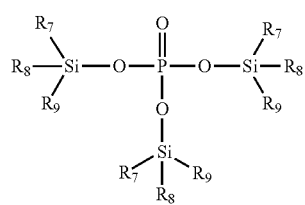

(4)

wherein, in Formula (4), $R_7$, $R_8$ and $R_9$ each independently represents an alkyl group having 1 to 6 carbon atoms.

<5> A lithium secondary battery comprising, as a cathode active material, a composite oxide in which at least 35% by mole of a transition metal included in the composite oxide is manganese, and the lithium secondary battery comprising a non-aqueous electrolytic solution comprising an unsaturated sultone.

<6> The lithium secondary battery according to <5>, wherein the unsaturated sultone is represented by following Formula (1):

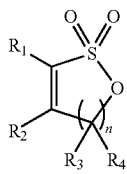

(1)

wherein, in Formula (1), $R_1$, $R_2$, $R_3$ and $R_4$ each independently represents a hydrogen atom, a fluorine atom, or a hydrocarbon group having 1 to 12 carbon atoms that can be substituted by a fluorine atom; and n represents an integer of from 0 to 3.

<7> The lithium secondary battery according to <5> or <6>, wherein the non-aqueous electrolytic solution further comprises:
a fluorinated ethylene carbonate; or
vinylene carbonate, or a vinylene carbonate derivative, represented by following Formula (3):

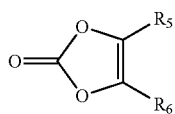

(3)

wherein, in Formula (3), $R_5$ and $R_6$ each independently represents a hydrogen atom, a methyl group, an ethyl group or a propyl group.

<8> The lithium secondary battery according to any one of <5> to <7>, wherein the non-aqueous electrolytic solution further comprises a silyl phosphate derivative represented by following Formula (4):

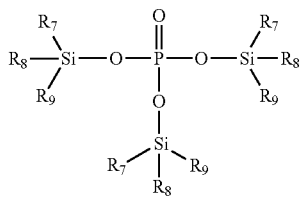

(4)

wherein, in Formula (4), $R_7$, $R_8$ and $R_9$ each independently represents an alkyl group having 1 to 6 carbon atoms.

<9> The lithium secondary battery according to any one of <5> to <8> comprising, as an anode active material, at least one selected from the group consisting of lithium metal, a lithium-containing alloy, a metal capable of forming an alloy with lithium, an alloy capable of forming an alloy with lithium, an oxide capable of being doped and capable of being dedoped with lithium ions, a transition metal nitride capable of being doped and capable of being dedoped with lithium ions, and a carbon material capable of being doped and capable of being dedoped with lithium ions.

Effect of the Invention

According to the present invention, a non-aqueous electrolytic solution capable of realizing extension of the life of a lithium secondary battery containing manganese as a cathode active material, and a lithium secondary battery using the non-aqueous electrolytic solution, can be provided.

BRIEF DESCRIPTION OF THE DRAWINGS

FIG. 1 is a schematic cross-sectional view of a coin-shaped battery representing one example of the lithium secondary battery of the present invention.

BEST MODE FOR CARRYING OUT THE INVENTION

Hereinbelow, details of the non-aqueous electrolytic solution and the lithium secondary battery of the present invention will be described.

The non-aqueous electrolytic solution of the present invention is a non-aqueous electrolytic solution for a lithium secondary battery, wherein the lithium secondary battery includes, as a cathode active material, a composite oxide in which at least 35% by mole of a transition metal included in the composite oxide is manganese, and wherein the non-aqueous electrolytic solution includes an unsaturated sultone.

In the present invention, the "non-aqueous electrolytic solution" refers to a solution including a non-aqueous solvent and an electrolyte.

Further, the lithium secondary battery of the present invention is a lithium secondary battery using the non-aqueous electrolytic solution of the present invention.

<Unsaturated Sultone>

The non-aqueous electrolytic solution of the present invention contains an unsaturated sultone.

The unsaturated sultone in the present invention is a cyclic sulfonic acid ester and is a sultone compound having a carbon-carbon unsaturated bond in the ring.

In particular, an unsaturated sultone having a specific structure represented by the following Formula (1) is preferred.

(1)

In Formula (1), $R_1$, $R_2$, $R_3$ and $R_4$ each independently represent a hydrogen atom, a fluorine atom, or a hydrocarbon group having 1 to 12 carbon atoms, which may be substituted by a fluorine atom, and n represents an integer of 0 to 3.

Specific examples of the "hydrocarbon group having 1 to 12 carbon atoms which is optionally substituted by a fluorine atom" include a methyl group, an ethyl group, a vinyl group, an ethynyl group, a propyl group, an isopropyl group, a 1-propenyl group, a 2-propenyl group, a 1-propynyl group, a 2-propynyl group, a butyl group, a sec-butyl group, a t-butyl group, a 1-butenyl group, a 2-butenyl group, a 3-butenyl group, a 2-methyl-2-propenyl group, a 1-methylenepropyl group, a 1-methyl-2-propenyl group, a 1,2-dimethylvinyl group, a 1-butynyl group, a 2-butynyl group, a 3-butynyl group, a pentyl group, a 1-methylbutyl group, a 2-methylbutyl group, a 3-methylbutyl group, a 1-methyl-2-methyl propyl group, a 2,2-dimethyl propyl group, a phenyl group, a methylphenyl group, an ethylphenyl group, a vinylphenyl group, an ethynylphenyl group, a hexyl group, a cyclohexyl group, a heptyl group, an octyl group, a nonyl group, a decyl group, an undecyl group, a dodecyl group, a difluoromethyl group, a monofluoromethyl group, a trifluoromethyl group, a trifluoroethyl group, a difluoroethyl group, a pentafluoroethyl group, a pentafluoropropyl group, a tetrafluoropropyl group, a perfluorobutyl group, a perfluoropentyl group, a perfluorohexyl group, a perfluorocyclohexyl group, a perfluoroheptyl group, a perfluorooctyl group, a perfluorononyl group, a perfluorodecyl group, a perfluoroundecyl group, a perfluorododecyl group, a fluorophenyl group, a difluorophenyl group, a trifluorophenyl group, a perfluorophenyl group, a trifluoromethylphenyl group, a naphthyl group, a biphenyl group, and the like.

Among these examples, from the viewpoint of the solubility in a non-aqueous electrolytic solution, each of $R_1$ to $R_4$ preferably independently represents a hydrogen atom, a fluorine atom, or a hydrocarbon group having 1 to 4 carbon atoms, which may be substituted by a fluorine atom, and more preferably a hydrogen atom, a fluorine atom, or a hydrocarbon group having 1 to 2 carbon atoms, which may be substituted by a fluorine atom.

In particular, it is most preferred that all of $R_1$ to $R_4$ be hydrogen atoms. Further, n is preferably 1 or 2, and more preferably 1.

The most preferred unsaturated sultone represented by Formula (1) is 1,3-prop-1-ene sultone represented by the following Formula (2).

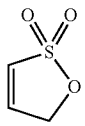

(2)

This compound can be synthesized by the method described in the following documents, or other methods.

Angew. Chem./70. Jahrg. 1958/Nr. 16, Ger. Pat. 1146870 (1963) (CA 59, 11259 (1963)), Can. J. Chem., 48, 3704 (1970), Synlett, 1411 (1988), Chem. Commun., 611 (1997), Tetrahedron 55, 2245 (1999).

The non-aqueous electrolytic solution containing an unsaturated sultone according to the present invention is highly effective in suppressing the decomposition by reduction of the electrolytic solution on the anode and suppressing the capacity reduction of a battery during a high-temperature storage test or during a cycle test, and suppressing generation of a gas due to the decomposition of the electrolytic solution. In addition, the non-aqueous electrolytic solution inhibits an increase in the interfacial impedance of the cathode during a high-temperature storage test or during a cycle test, and inhibits deterioration of load characteristics.

As described above, the unsaturated sultone used in the present invention is effective as an additive for an electrolytic solution, and can impart excellent characteristics to the electrolytic solution.

The mechanism of the effect of the unsaturated sultone in the present invention is thought to be as follows: (1) unsaturated bonds in a part of unsaturated sultone compounds undergo reaction on the anode and are bonded to the anode, thereby forming a stable coating film, and (2) unsaturated sultone compounds that do not form the coating film on the anode are decomposed due to reduction decomposition of sultone groups on the anode, and a sulfur compound produced from this decomposition undergoes oxidation reaction on the cathode, thereby forming a coating film on the cathode. That is, it is thought that the unsaturated sultone is a compound capable of forming a coating film on both the cathode and the anode.

However, the present invention is not limited to the above-described mechanism.

That is, as described later, it is thought that the unsaturated sultone in the present invention can inhibit unfavorable effects on the cathode and the anode due to manganese elution that may occur in the cathode containing manganese. Among the unsaturated sultones represented by Formula (1), 1,3-prop-1-ene sultone represented by Formula (2) is particularly preferable from the viewpoint of achieving these effects.

The addition amount of the unsaturated sultone in the present invention to the non-aqueous electrolytic solution is preferably from 0.0001% by mass to 30% by mass, more preferably from 0.001% by mass to 10% by mass, further preferably from 0.1% by mass to 7% by mass, even further preferably from 0.2% by mass to 5% by mass, and particularly preferably from 0.2% by mass to 2.0% by mass, with respect to the non-aqueous electrolytic solution.

If the addition amount of the unsaturated sultone to the non-aqueous electrolytic solution is low, it may be difficult to exhibit the above effects, whereas if the addition amount is too high, the interfacial impedance of the anode may increase.

<Non-Aqueous Solvent>

The non-aqueous electrolytic solution of the present invention contains a non-aqueous solvent.

The non-aqueous solvent may be selected from various known solvents, but in particular, the non-aqueous solvent preferably contains a cyclic aprotic solvent and/or a chain aprotic solvent.

By including a cyclic aprotic solvent in the non-aqueous solvent, the flash point of the non-aqueous solvent can be made higher.

The cyclic aprotic solvent may be used alone or as a mixture of two or more kinds thereof.

It is also possible to use a mixture of a cyclic aprotic solvent and a chain aprotic solvent. However, when a cyclic aprotic solvent and a chain aprotic solvent are used as a mixture, the mixing ratio of the chain aprotic solvent is preferably less than 20% by mass with respect to the total non-aqueous solvent.

Examples of the cyclic aprotic solvent include cyclic carbonates such as ethylene carbonate, cyclic carboxylic acid esters such as γ-butyrolactone, cyclic sulfones such as sulfolane, and cyclic ethers such as dioxolane.

Specific examples of the cyclic carbonate include ethylene carbonate, propylene carbonate, 1,2-butylene carbonate, 2,3-butylene carbonate, 1,2-pentylene carbonate, 2,3-pentylene carbonate, and the like. Ethylene carbonate or propylene carbonate, which has a high dielectric constant, is particularly preferably used. In the case of a battery in which graphite is used as an anode active material, ethylene carbonate is particularly suitable. These cyclic carbonates may be used as a mixture of two or more kinds thereof.

Specific examples of the cyclic carboxylic acid ester include γ-butyrolactone, δ-valerolactone, or alkyl-substituted cyclic carboxylic acid esters such as methyl γ-butyrolactone, ethyl γ-butyrolactone, ethyl δ-valerolactone, and the like.

The cyclic carboxylic acid ester has a low vapor pressure, a low viscosity, and a high dielectric constant. Accordingly, the viscosity of the electrolytic solution can be reduced without lowering the flash point of the electrolytic solution or lowering the dissociation degree of the electrolyte. Consequently, cyclic carboxylic acid esters have such a feature that the conductivity of the electrolytic solution, which is an index concerning discharge characteristics of a battery, can be increased without increasing the flammability of the electrolytic solution. Accordingly, from the viewpoint of achieving a yet higher flash point of the solvent, cyclic carboxylic acid esters are preferably used as the cyclic aprotic solvent, and γ-butyrolactone is most preferable.

The cyclic carboxylic acid ester is preferably used in combination with a cyclic aprotic solvent other than the cyclic carboxylic acid ester. One exemplary embodiment is a combination of a cyclic carboxylic acid ester with a cyclic carbonate and/or a chain carbonate.

Specific examples of the combination of a cyclic carboxylic acid ester with a cyclic carbonate and/or a chain carbonate include a combination of γ-butyrolactone and ethylene carbonate, a combination of γ-butyrolactone, ethylene carbonate and dimethyl carbonate, a combination of γ-butyrolactone, ethylene carbonate and methyl ethyl carbonate, a combination of γ-butyrolactone, ethylene carbonate and diethyl carbonate, a combination of γ-butyrolactone and propylene carbonate, a combination of γ-butyrolactone, propylene carbonate and dimethyl carbonate, a combination of γ-butyrolactone, propylene carbonate and methyl ethyl carbonate, a combination of γ-butyrolactone, propylene carbonate and diethyl carbonate, a combination of γ-butyrolactone, ethylene carbonate and propylene carbonate, a combination of γ-butyrolactone, ethylene carbonate, propylene carbonate and dimethyl carbonate, a combination of γ-butyrolactone, ethylene carbonate, propylene carbonate and methyl ethyl carbonate, a combination of γ-butyrolactone, ethylene carbonate, propylene carbonate and diethyl carbonate, a combination of γ-butyrolactone, ethylene carbonate, dimethyl carbonate and methyl ethyl carbonate, a combination of γ-butyrolactone, ethylene carbonate, dimethyl carbonate and diethyl carbonate, a combination of γ-butyrolactone, ethylene carbonate, methyl ethyl carbonate and diethyl carbonate, a combination of γ-butyrolactone, ethylene carbonate, dimethyl carbonate, methyl ethyl carbonate and diethyl carbonate, a combination of γ-butyrolactone, ethylene carbonate, propylene carbonate, dimethyl carbonate and methyl ethyl carbonate, a combination of γ-butyrolactone, ethylene carbonate, propylene carbonate, dimethyl carbonate and diethyl carbonate, a combination of γ-butyrolactone, ethylene carbonate, propylene carbonate, methyl ethyl carbonate and diethyl carbonate, a combination of γ-butyrolactone, ethylene carbonate, propylene carbonate, dimethyl carbonate, methyl ethyl carbonate and diethyl carbonate, a combination of γ-butyrolactone and sulfolane, a combination of γ-butyrolactone, ethylene carbonate and sulfolane, a combination of γ-butyrolactone, propylene carbonate and sulfolane, a combination of γ-butyrolactone, ethylene carbonate, propylene carbonate and sulfolane, a combination of γ-butyrolactone, sulfolane and dimethyl carbonate, and the like.

The content of the cyclic carboxylic acid ester in the non-aqueous solvent is preferably from 100% by mass to 10% by mass, more preferably from 90% by mass to 20% by mass, and particularly preferably from 80% by mass to 30% by mass. When the ratio is within this range, conductivity of the non-aqueous electrolytic solution, which concerns the charge/discharge characteristics of a battery, can be increased.

Examples of the cyclic sulfone include sulfolane, 2-methyl sulfolane, 3-methyl sulfolane, dimethyl sulfone, diethyl sulfone, dipropyl sulfone, methyl ethyl sulfone, methyl propyl sulfone, and the like.

Examples of the chain aprotic solvent include chain carbonates such as dimethyl carbonate, chain carboxylic acid esters such as methyl pivalate, chain ethers such as dimethoxy ethane, and chain phosphoric acid esters such as trimethyl phosphate.

Specific examples of the chain carbonate include dimethyl carbonate, methyl ethyl carbonate, diethyl carbonate, methyl propyl carbonate, methyl isopropyl carbonate, ethyl propyl carbonate, dipropyl carbonate, methyl butyl carbonate, ethyl butyl carbonate, dibutyl carbonate, methyl pentyl carbonate, ethyl pentyl carbonate, dipentyl carbonate, methyl heptyl carbonate, ethyl heptyl carbonate, diheptyl carbonate, methyl hexyl carbonate, ethyl hexyl carbonate, dihexyl carbonate, methyl octyl carbonate, ethyl octyl carbonate, dioctyl carbonate, methyl trifluoroethyl carbonate, and the like. These chain carbonates may be used as a mixture of two or more kinds thereof.

The chain aprotic solvents may be used in combination of two or more kinds thereof in view of further increasing the flash point of the non-aqueous solvent.

Examples of the chain aprotic solvent include chain carbonates, chain carboxylic acid esters, and chain phosphoric acid esters. Among these, chain carbonates such as dimethyl carbonate, diethyl carbonate, dipropyl carbonate, dibutyl carbonate, diheptyl carbonate, methyl ethyl carbonate, methyl propyl carbonate, methyl butyl carbonate, methyl heptyl carbonate, and the like are particularly preferred.

The non-aqueous solvents in the present invention may be used alone or in combination of plural kinds thereof.

It is also possible to use only one or more kinds of cyclic aprotic solvent, only one or more kinds of chain aprotic solvent, or a combination of a cyclic aprotic solvent and a chain aprotic solvent.

Among these, when improvements in load characteristics and low-temperature characteristics of a battery are particularly intended, the non-aqueous solvent is preferably a combination of a cyclic aprotic solvent and a chain aprotic solvent. In addition, in view of the electrochemical stability of the electrolytic solution, it is particularly preferable to combine a cyclic carbonate as the cyclic aprotic solvent with a chain carbonate as the chain aprotic solvent. It is also possible to increase the conductivity of the electrolytic solution, which concerns the charge/discharge characteristics of a battery, by combining a cyclic carboxylic acid ester with a cyclic carbonate and/or a chain carbonate.

Specific examples of the combination of a cyclic carbonate with a chain carbonate include a combination of ethylene carbonate and dimethyl carbonate, a combination of ethylene carbonate and methyl ethyl carbonate, a combination of ethylene carbonate and diethyl carbonate, a combination of propylene carbonate and dimethyl carbonate, a combination of propylene carbonate and methyl ethyl carbonate, a combination of propylene carbonate and diethyl carbonate, a combination of ethylene carbonate, propylene carbonate and methyl ethyl carbonate, a combination of ethylene carbonate, propylene carbonate and diethyl carbonate, a combination of ethylene carbonate, dimethyl carbonate and methyl ethyl carbonate, a combination of ethylene carbonate, dimethyl carbonate and diethyl carbonate, a combination of ethylene carbonate, methyl ethyl carbonate and diethyl carbonate, a combination of ethylene carbonate, dimethyl carbonate, methyl ethyl carbonate and diethyl carbonate, a combination of ethylene carbonate, propylene carbonate, dimethyl carbonate and methyl ethyl carbonate, a combination of ethylene carbonate, propylene carbonate, dimethyl carbonate and diethyl carbonate, a combination of ethylene carbonate, propylene carbonate, methyl ethyl carbonate and diethyl carbonate, a combination of ethylene carbonate, propylene carbonate, dimethyl carbonate, methyl ethyl carbonate and diethyl carbonate, and the like.

The mass ratio of a cyclic carbonate to a chain carbonate, or cyclic carbonate:chain carbonate, is preferably from 5:95 to 80:20, more preferably from 10:90 to 70:30, and particularly preferably from 15:85 to 55:45. By satisfying this ratio, an increase in the viscosity of the electrolytic solution can be suppressed and the dissociation degree of the electrolyte can be increased. Thus, the conductivity of the electrolytic solution, concerning the charge/discharge characteristics of a battery, can be increased. In addition, the solubility of the electrolyte can be further increased. As a result, an electrolytic solution having excellent electrical conductivity at room temperature or low temperature can be obtained and, accordingly, the load characteristics of a battery at from room temperature to low temperature can be improved.

The non-aqueous electrolytic solution according to the present invention may include a further solvent other than those described above, as a non-aqueous solvent. Specific examples of other solvents include amides such as dimethyl formamide, chain carbamates such as methyl-N,N-dimethyl carbamate, cyclic amides such as N-methylpyrrolidone, cyclic ureas such as N,N-dimethyl imidazolidinone, boric acid compounds such as trimethyl borate, triethyl borate, tributyl borate, trioctyl borate and trimethyl silyl borate, and polyethylene glycol derivatives represented by the following formulae.

$HO(CH_2CH_2O)_aH$ $HO[CH_2CH(CH_3)O]_bH$ $CH_3O(CH_2CH_2O)_cH$ $CH_3O[CH_2CH(CH_3)O]_dH$ $CH_3O(CH_2CH_2O)_eCH_3$ $CH_3O[CH_2CH(CH_3)O]_fCH_3$ $C_9H_{19}PhO(CH_2CH_2O)_g[CH(CH_3)O]_hCH_3$ (ph is a Phenyl Group)

$CH_3O[CH_2CH(CH_3)O]_iCO[OCH(CH_3)CH_2]_jOCH_3$ (in the above formulae, a to f are integers of from 5 to 250, g to j are integers of from 2 to 249, $5 \le g+h \le 250$, and $5 \le i+j \le 250$.)

<Other Additives>

The non-aqueous electrolytic solution of the present invention may include other additives, in addition to the aforementioned unsaturated sultone, as long as the purpose of the present invention is not impaired. By including additives, it is possible to impart further superior characteristics to the non-aqueous electrolytic solution.

Examples of the other additives include a fluorinated ethylene carbonate, or a vinylene carbonate or a vinylene carbonate derivative represented by Formula (3).

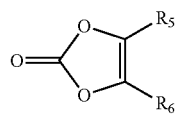

(3)

In Formula (3), $R_5$ and $R_6$ each independently represent a hydrogen atom, a methyl group, an ethyl group or a propyl group.

The fluorinated ethylene carbonate, or the vinylene carbonate or the vinylene carbonate derivative represented by Formula (3) are preferable from the viewpoint of forming a surface coating film of the anode.

Examples of the vinylene carbonate or the vinylene carbonate derivative represented by Formula (3) include vinylene carbonate, methyl vinylene carbonate, ethyl vinylene carbonate, propyl vinylene carbonate, dimethyl vinylene carbonate, diethyl vinylene carbonate, dipropyl vinylene carbonate, and the like. Among these, vinylene carbonate is most preferable.

Known compounds may be used as the fluorinated ethylene carbonate, and examples thereof include fluorinated ethylene carbonates formed by substituting 1 to 4 hydrogen atoms in ethylene carbonate by a fluorine atom, such as 4-fluoroethylene carbonate, 4,4-difluoroethylene carbonate, 4,5-difluoroethylene carbonate, 4,4,5-trifluoroethylene carbonate, 4,4,5,5-tetrafluoroethylene carbonate, and the like. Among these, 4,5-difluoroethylene carbonate and 4-fluoroethylene carbonate are most preferred.

The content of the fluorinated ethylene carbonate, or the vinylene carbonate or the vinylene carbonate derivative represented by Formula (3), can be appropriately selected according to the purposes, but is preferably from 0.001% by mass to 10% by mass, and more preferably from 0.5% by mass to 3% by mass, with respect to the total amount of the non-aqueous electrolytic solution.

Examples of the other additives in the non-aqueous electrolytic solution of the present invention include a silyl phosphate derivative represented by Formula (4).

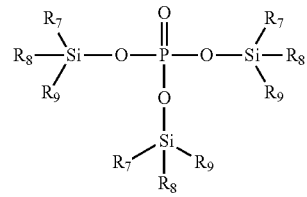

(4)

In Formula (4), $R_7$ to $R_9$ each independently represents an alkyl group having 1 to 6 carbon atoms.

The silyl phosphate derivative represented by Formula (4) is preferable from the viewpoint of achieving an effect of trapping water or acid contents in the battery. Examples of the silyl phosphate derivative represented by Formula (4) include tris(trimethylsilyl)phosphate, tris(triethylsilyl)phosphate, tris(triisopropylsilyl)phosphate, tris(t-butyldimethylsilyl)phosphate, and the like. Among these, the silyl phosphate derivative represented by the following Formula (5), i.e., tris(trimethylsilyl)phosphate is most preferable.

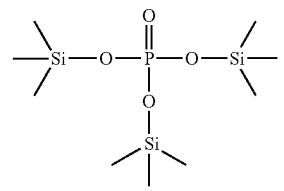

(5)

The content of the silyl phosphate derivative represented by Formula (4) can be appropriately selected according to the purposes, but it is preferably from 0.001% by mass to 10% by mass, more preferably from 0.1% by mass to 4.0% by mass, and particularly preferably from 0.1% by mass to 3.0% by mass, with respect to the total amount of the non-aqueous electrolytic solution.

The non-aqueous electrolytic solution of the present invention may contain one or more kinds of the fluorinated ethylene carbonate, or the vinylene carbonate or vinylene carbonate derivative represented by Formula (3).

Further, the non-aqueous electrolytic solution of the present invention may contain one or more kinds of the silyl phosphate derivative represented by Formula (4).

In addition, the non-aqueous electrolytic solution of the present invention may contain a combination of one or more kinds of the fluorinated ethylene carbonate, or the vinylene carbonate or vinylene carbonate derivative represented by Formula (3), and one or more kinds of a silyl phosphate derivative represented by Formula (4). For example, the non-aqueous electrolytic solution may contain both vinylene carbonate and tris(trimethylsilyl)phosphate.

When the non-aqueous electrolytic solution of the present invention contains the above-described other additives, the mass ratio of the unsaturated sultone to the other additives is preferably from 1:100 to 100:1, more preferably from 1:20 to 20:1, and particularly preferably from 1:5 to 20:1. Further, in the non-aqueous electrolytic solution of the present invention, the total amount of the unsaturated sultone and the other additives is preferably 30% by mass or less with respect to the total non-aqueous electrolytic solution.

<Non-Aqueous Electrolytic Solution>

The non-aqueous electrolytic solution of the present invention contains an unsaturated sultone, and further, a non-aqueous solvent and an electrolyte.

Various known electrolytes may be used in the non-aqueous electrolytic solution of the present invention, and any of those usually used as an electrolyte for a non-aqueous electrolytic solution are applicable.

Specific examples of the electrolyte include tetraalkyl ammonium salts such as $(C_2H_5)_4NPF_6$, $(C_2H_5)_4NBF_4$, $(C_2H_5)_4NClO_4$, $(C_2H_5)_4NAsF_6$, $(C_2H_5)_4N_2SiF_6$, $(C_2H_5)_4NOSO_2C_kF_{(2k+1)}$ [k=an integer of 1 to 8] and $(C_2H_5)_4NPF_n[C_kF_{(2k+1)}]_{(6-n)}$ [n=an integer of 1 to 5, k=an integer of 1 to 8]; and lithium salts such as $LiPF_6$, $LiBF_4$, $LiClO_4$, $LiAsF_6$, $Li_2SiF_6$, $LiOSO_2C_kF_{(2k+1)}$ [k=an integer of 1 to 8], and $LiPF_n[C_kF_{(2k+1)}]_{(6-n)}$ [n=an integer of 1 to 5, k=an integer of 1 to 8].

Moreover, the lithium salts represented by the following formula are also applicable.

$LiC(SO_2R_7)(SO_2R_8)(SO_2R_9), LiN(SO_2OR_{10})(SO_2OR_{11})$, and $LiN(SO_2R_{12})(SO_2R_{13})$.

[wherein $R_7$ to $R_{13}$ may be the same or different from each other, and are each a perfluoroalkyl group having 1 to 8 carbon atoms].

These electrolytes may be used alone or as a mixture of two or more kinds thereof.

Among these, a lithium salt is particularly preferable, and $LiPF_6$, $LiBF_4$, $LiOSO_2C_kF_{(2k+1)}$ [k=an integer of 1 to 8], $LiClO_4$, $LiAsF_6$, $LiNSO_2[C_kF_{(2k+1)}]_2$ [k=an integer of 1 to 8], and $LiPF_n[C_kF_{(2k+1)}]_{(6-n)}$ [n=1 to 5, k=an integer of 1 to 8] are further preferable.

The electrolyte in the present invention is usually preferably contained at a concentration of from 0.1 moles/liter to 3 moles/liter, and more preferably from 0.5 moles/liter to 2 moles/liter in the non-aqueous electrolyte.

In the non-aqueous electrolytic solution of the present invention, when a cyclic carboxylic acid ester such as γ-butyrolactone is used as a non-aqueous solvent, $LiPF_6$ is particularly preferably contained as an electrolyte. Since $LiPF_6$ has a high dissociation degree, it can increase the conductivity of the electrolytic solution, and suppress the reduction decomposition reaction of the electrolytic solution on the anode.

$LiPF_6$ may be used alone or in combination with a further electrolyte other than $LiPF_6$. The electrolyte other than $LiPF_6$ may be any of those usually used as an electrolyte for a non-aqueous electrolytic solution, but is preferably a lithium salt other than $LiPF_6$ selected from the specific examples of a lithium salt as described above.

Specific examples of the combination of $LiPF_6$ and the other electrolyte include a combination of $LiPF_6$ and $LiBF_4$, a combination of $LiPF_6$ and $LiN[SO_2C_kF_{(2k+1)}]_2$ (k=an integer of 1 to 8), a combination of $LiPF_6$, $LiBF_4$, and $LiN[SO_2C_kF_{(2k+1)}]$ (k=an integer of 1 to 8), and the like.

The ratio of $LiPF_6$ in the lithium salt is preferably from 100% by mass to 1% by mass, more preferably from 100% by mass to 10% by mass, and further preferably from 100% by mass to 50% by mass. The electrolyte is preferably contained in the non-aqueous electrolytic solution at a concentration of from 0.1 moles/liter to 3 moles/liter, and preferably from 0.5 moles/liter to 2 moles/liter.

The non-aqueous electrolytic solution of the present invention is not only suitable as a non-aqueous electrolytic solution for lithium secondary batteries, but is also applicable as a non-aqueous electrolytic solution for primary batteries, a non-aqueous electrolytic solution for electrochemical capacitors, or an electrolytic solution for electrical bilayer capacitors or aluminum electrolytic capacitors.

<Lithium Secondary Battery>

The lithium secondary battery of the present invention includes an anode, a cathode, and the non-aqueous electrolytic solution as described above. Further, as necessary, a separator is provided between the anode and the cathode.

The anode active material that forms the anode may be at least one selected from the group consisting of lithium metal, a lithium-containing alloy, a metal capable of forming an alloy with lithium, an alloy capable of forming an alloy with lithium, an oxide capable of being doped and capable of being dedoped with lithium ions, a transition metal nitride capable of being doped and capable of being dedoped with lithium ions, and a carbon material capable of being doped and capable of being dedoped with lithium ions.

Examples of the metal capable of forming an alloy with lithium ions or the alloy capable of forming an alloy with lithium include silicon, a silicon alloy, tin, a tin alloy, and the like.

Among these, the anode active material is preferably a carbon material capable of being doped and capable of being dedoped with lithium ions is preferable.

Examples of the carbon material include carbon black, activated carbon, graphite materials (for example, artificial graphite, natural graphite, and the like), amorphous carbon materials, and the like.

The carbon material may have any one of a fibrous shape, a spherical shape, a potato shape, or a flake shape.

Specific examples of the amorphous carbon material include hard carbon, cokes, mesocarbon microbeads (MCMB) baked at 1500° C. or lower, mesophase pitch carbon fibers (MCF), and the like.

Examples of the graphite material include natural graphite, artificial graphite, and the like.

The artificial graphites include graphitized MCMB, graphitized MCF, and the like.

Further, as the graphite material, a boron-containing graphite material or the like may be used.

In addition, a graphite material coated with metal such as gold, platinum, silver, copper, or tin, or a graphite material coated with amorphous carbon can also be used.

A mixture of an amorphous carbon material and a graphite material can also be used.

The carbon material may be used alone or as a mixture of two or more kinds thereof.

Moreover, as the carbon material, a carbon material having a planar spacing d(002) at a surface (002) as measured by X-ray analysis of 0.340 nm or less is particularly preferable.

Further, as the carbon material, a graphite material having a true density of 1.70 g/cm$^3$ or more, or a high-crystallinity carbon material having properties similar to that of a graphite material having a true density of 1.70 g/cm$^3$ or more, is preferable. By using these carbon materials, the energy density of the battery can be increased.

The cathode active material that forms the cathode in the present invention is a material containing a transition metal that can be electrochemically doped and undoped with lithium ions, and this material contains manganese as at least a part of the transition metal. Manganese is readily available at low cost, and is preferable as a cathode active material.

Specifically, the cathode active material in the present invention is a composite oxide containing a transition metal, in which at least 35% by mole of the transition metal is manganese. Namely, in the present invention, a composite oxide containing a transition metal, in which the content of manganese in the transition metal is 35% by mole or more, is used as the cathode active material.

The content of manganese in the transition metal is preferably 50% by mole or more, more preferably 70% by mole or more, and most preferably 100% by mole.

The composite oxide preferably contains lithium. Namely, the composite oxide is preferably a composite oxide containing a transition metal including at least 35% by mole of manganese, and lithium.

Although the manganese-containing cathode active material is not particularly limited, it preferably includes, for example, a composite oxide represented by the following composition formula (6).

$$Li_xMn_{(1-y)}M^1{}_yO_2 \quad (6)$$

In the composition formula (6), x represents a number satisfying $0<x\leq1.2$, y represents a number satisfying $0\leq y\leq0.8$, and $M^1$ represents at least one element selected from the group consisting of Ni, Co, Al, Fe, Ti, Mg, Cr, Ga, Cu, Zn and Nb.

In the composition formula (6), $M^1$ is preferably Ni, Co or Fe.

Preferably, x satisfies $0.2\leq x\leq1.15$.

Preferably, y satisfies $0\leq y\leq0.65$.

It is also preferable to include a composite oxide represented by the following composition formula (7).

$$Li_xMn_{(2-y)}M^2{}_yO_4 \quad (7)$$

In the composition formula (7), x represents a number satisfying $0\leq x\leq1.2$, y represents a number satisfying $0\leq x\leq0.8$, and $M^2$ represents at least one element selected from the group consisting of Ni, Co, Al, Fe, Ti, Mg, Cr, Ga, Cu, Zn and Nb.

In the composition formula (7), $M^2$ is preferably Ni, Co, Al or Mg.

Preferably, x satisfies $0.05\leq x\leq1.15$.

Preferably, y satisfies $0\leq y\leq0.7$, more preferably satisfies $0\leq y\leq0.4$, and particularly preferably satisfies $0\leq y\leq0.2$.

Specific examples of the composite oxide having the composition represented by the composition formula (7) include $LiMn_{1.8}Al_{0.2}O_4$, $LiMn_{1.5}Ni_{0.5}O_4$, $LiMn_{2.0}O_4$, and the like.

The cathode active materials may be used alone or as a mixture of two or more kinds thereof.

When the cathode active material exhibits insufficient conductivity, it can be combined with a conductive auxiliary agent to form a cathode.

Examples of the conductive auxiliary agents include carbon materials such as carbon black, amorphous whiskers, graphite, and the like.

The cathode in the present invention contains a large amount of manganese.

The cathode has a spinel structure rather than a layered structure, but it is known that a cathode having a spinel structure causes elution of manganese from the cathode during charging/discharging of the battery, whereby a manganese compound is deposited on the anode and deterioration in the increase in the resistance is caused.

It is thought that the unsaturated sultone in the present invention forms a coating film on the cathode, and suppresses the elution of manganese, and further suppresses deposition of a manganese compound to the coating film on the anode.

Accordingly, a lithium secondary battery using a cathode formed from the cathode active material as described above exhibits a large residual discharge capacity after being stored at high-temperature, as well as a high capacity retention rate, thereby realizing extension of the life.

The separator in the present invention is a film that electrically insulates a cathode from an anode, and further allows lithium ions to penetrate therethrough. Examples of the separator include a porous film and a polymeric electrolyte.

As the porous film, a micro-porous polymeric film is suitably used, and exemplary materials thereof include polyolefin, polyimide, polyvinylidene fluoride, polyester and the like. A porous polyolefin is particularly preferable, and specific examples thereof include a porous polyethylene film, a porous polypropylene film, and a multilayered film of a porous polyethylene film with a porous polypropylene film. The porous polyolefin film may be coated with a resin of other kind having excellent thermal stability.

Examples of the polymeric electrolyte include a polymer in which a lithium salt is dissolved, a polymer which is swollen with an electrolytic solution, and the like.

The non-aqueous electrolytic solution of the present invention may be used also for the purpose of obtaining a polymeric electrolyte by swelling a polymer with the non-aqueous electrolytic solution.

The lithium secondary battery of the present invention includes an anode active material, a cathode active material, and a separator. The lithium secondary battery of the present invention may take various known shapes, including a cylindrical shape, a coin shape, a rectangular shape, a film shape, and any other shapes. However, the basic structure of the battery is the same regardless of the shape, and its design can be changed according to purposes.

Examples of the lithium secondary battery of the present invention include a coin type battery as shown in FIG. 1.

In the coin type battery as shown in FIG. 1, a disc-shaped anode 2, a separator 5 to which a non-aqueous electrolytic solution is injected, a disc-shaped cathode 1, and as necessary, spacer plates 7 and 8 made of stainless steel, aluminum or the like, are laminated in this order and positioned between a cathode can 3 (hereinafter, also referred to as a "battery can") and a sealing plate 4 (hereinafter, also referred to as a "battery can lid"). The cathode can 3 and the sealing plate 4 are sealed with caulking via a gasket 6.

The non-aqueous electrolytic solution of the present invention and the lithium secondary battery of the present invention are not particularly limited, and can be applied to various known applications without being particularly limited. For example, the non-aqueous electrolytic solution of the present invention and the lithium secondary battery of the present invention are applicable to a wide range of purposes including laptops, mobile PCs, mobile phones, headphone stereos, video movies, liquid crystal TVs, handy cleaners, electronic organizers, calculators, radios, backup power source applications, motors, vehicles, electric cars, motorcycles, electric powered motorcycles, bicycles, electric powered bicycles, lighting equipments, game consoles, watches, electric powered tools, cameras, and the like.

EXAMPLES

Hereinbelow, the present invention will be described in more detail with reference to the Examples, but the present invention is not limited to these Examples. The compounds are indicated in the following manner.

EC: ethylene carbonate
DEC: diethyl carbonate
PRS: 1,3-prop-1-ene sultone
VC: vinylene carbonate
TMSP: tris(trimethylsilyl)phosphate <Evaluation of Initial Characteristics of Battery>

A test battery was charged at a constant current of 1 mA and a constant voltage of 4.2 V, and then discharged to 2.85 V at a constant current of 1 mA. Ten cycles of this procedure were performed.

The first-round charge/discharge efficiency [%] (denoted as the "first-round efficiency [%]" in Table 1 as described later) was calculated from the charge capacity [mAh] and the discharge capacity [mAh] (denoted as the "first-round discharge capacity [mAh]" in Table 1 as described later), which were measured at the first cycle, in accordance with the following equation.

First-round charge/discharge efficiency [%]=(discharge capacity [mAh] at the first cycle/charge capacity [mAh] at the first cycle)×100[%]

<High-Temperature Storage Test of Battery>

The test battery after undergoing the ten cycles was charged at a constant current of 1 mA and a constant voltage of 4.2 V in a thermostat chamber at 25° C., and then discharged at a constant current of 1 mA to 2.85 V, and the discharge capacity [mAh] before the high-temperature storage test was measured. Then, after charging the test battery at a constant current of 1 mA and a constant voltage of 4.2 V, the temperature of the thermostat chamber was set at 80° C. and a two-day storage test (high-temperature storage test) of the test battery was carried out. At this time, charging or discharging of the battery was not carried out and only the voltage was measured. The voltage reduction of each battery during the high-temperature storage test was measured as the reduction in OCV [mV].

After the two-day high-temperature storage test at 80° C., the temperature of the thermostat chamber was again set at 25° C., and the battery was discharged at a constant current of 1 mA to 2.85 V, and the discharge capacity [mAh] after the high-temperature storage test (i.e., the residual discharge capacity remaining in the battery after the high-temperature storage test [mAh]) was measured. In addition, the capacity retention ratio [%] between before and after the high-temperature storage test was calculated by the following equation.

In Table 1 as described later, the discharge capacity after the high-temperature storage test [mAh] is denoted as the "discharge capacity [mAh] after high-temperature storage", and the capacity retention ratio between before and after the high-temperature storage test [%] is denoted as the "high-temperature storage capacity retention ratio [%]".

Capacity retention ratio between before and after the high-temperature storage test [%]=(discharge capacity after the high-temperature storage test [mAh]/discharge capacity before the high-temperature storage test [mAh])×100 [%]

Example 1

Preparation of Anode 20 parts by mass of artificial graphite, 80 parts by mass of natural graphite-based graphite, 1 part by mass of carboxymethyl cellulose, and 2 parts by mass of SBR latex were mixed with an aqueous solvent and kneaded, thereby preparing a paste-like anode mixture slurry.

Next, this anode mixture slurry was applied to a band-shaped anode current collector made of a copper foil to a thickness of 18 μm and dried, and then compressed by roll pressing. A sheet-shaped anode formed of an anode current collector and an anode active material layer was thus obtained.

The application density and the charging density of the anode active material layer were 10 mg/cm$^2$ and 1.5 g/ml, respectively.

<Preparation of Cathode>

90 parts by mass of LiMn$_2$O$_4$, 5 parts by mass of acetylene black, and 5 parts by mass of polyvinylidene fluoride were mixed with N-methylpyrrolidinone as a solvent and kneaded, thereby preparing a paste-like cathode mixture slurry.

Next, this cathode mixture slurry was applied to a band-shaped cathode current collector made of an aluminum foil to a thickness of 20 μm and dried, and then compressed by roll pressing. A sheet-shaped cathode formed of a cathode current collector and a cathode active material was thus obtained. The application density and the charging density of the cathode active material layer were 30 mg/cm$^2$ and 2.5 g/ml, respectively.

<Preparation of Non-Aqueous Electrolytic Solution>

EC and DEC were mixed at a ratio of 5:5 (mass ratio) as a non-aqueous solvent.

In the obtained mixed liquid, LiPF$_6$ as an electrolyte was dissolved such that the concentration of the electrolyte with respect to the total amount of finally prepared non-aqueous electrolytic solution was 1 mole/liter.

PRS as an additive was added to the obtained solution in an amount of 0.5% by mass with respect to the total amount of the non-aqueous electrolytic solution, thereby obtaining a non-aqueous electrolytic solution.

<Preparation of Coin-Type Battery>

The above-described anode was punched out in the form of a disc having a diameter of 14 mm and the above-described cathode was punched out in the form of a disc having a diameter of 13 mm, thereby obtaining coin-shaped electrodes (anode and cathode). A separator was formed by punching out a micro-porous polyethylene film having a thickness of 20 μm in the form of a disc having a diameter of 17 mm.

The obtained coin-shaped anode, separator, and coin-shaped cathode were stacked in this order and placed in a can (2032 size) made of stainless steel, and 20 μl of the above-obtained non-aqueous electrolytic solution was injected thereinto so that the separator, the cathode, and the anode were impregnated. Further, a plate made of aluminum (thickness: 1.2 mm, diameter: 16 mm) and a spring were placed on the cathode, and sealed with a battery can lid and calked via a gasket made of polypropylene. A coin-type battery having a diameter of 20 mm and a height of 3.2 mm was thus obtained.

Using the obtained coin-type battery, evaluation of the initial characteristics and a high-temperature storage test were carried out.

Example 2

A coin-type battery was prepared in a similar manner to Example 1, except that the non-aqueous electrolytic solution was prepared by adding PRS and VC as additives in an amount of 0.5% by mass with respect to the total amount of the non-aqueous solution, respectively, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 3

A coin-type battery was prepared in a similar manner to Example 1, except that the non-aqueous electrolytic solution was prepared by adding PRS, VC and TMSP as additives in an amount of 0.5% by mass with respect to the total amount of the non-aqueous solution, respectively, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 4

A coin-type battery was prepared in a similar manner to Example 1, except that the non-aqueous electrolytic solution was prepared by adding PRS, VC and TMSP as additives such that the amount of PRS was 0.1% by mass, the amount of VC was 0.5% by mass and the amount of TMSP was 0.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 5

A coin-type battery was prepared in a similar manner to Example 1, except that the non-aqueous electrolytic solution was prepared by adding PRS, VC and TMSP as additives such that the amount of PRS was 0.2% by mass, the amount of VC was 0.5% by mass and the amount of TMSP was 0.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 6

A coin-type battery was prepared in a similar manner to Example 1, except that the non-aqueous electrolytic solution was prepared by adding PRS, VC and TMSP as additives such that the amount of PRS was 1.0% by mass, the amount of VC was 0.5% by mass and the amount of TMSP was 0.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 7

A coin-type battery was prepared in a similar manner to Example 1, except that the non-aqueous electrolytic solution was prepared by adding PRS, VC and TMSP as additives such that the amount of PRS was 1.5% by mass, the amount of VC was 0.5% by mass and the amount of TMSP was 0.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 8

A coin-type battery was prepared in a similar manner to Example 1, except that the non-aqueous electrolytic solution was prepared by adding PRS, VC and TMSP as additives such that the amount of PRS was 2.0% by mass, the amount of VC was 0.5% by mass and the amount of TMSP was 0.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 9

A coin-type battery was prepared in a similar manner to Example 1, except that the non-aqueous electrolytic solution was prepared by adding PRS, VC and TMSP as additives such that the amount of PRS was 0.5% by mass, the amount of VC was 0.5% by mass and the amount of TMSP was 0.1% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 10

A coin-type battery was prepared in a similar manner to Example 1, except that the non-aqueous electrolytic solution was prepared by adding PRS, VC and TMSP as additives such that the amount of PRS was 0.5% by mass, the amount of VC was 0.5% by mass and the amount of TMSP was 0.2% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 11

A coin-type battery was prepared in a similar manner to Example 1, except that the non-aqueous electrolytic solution was prepared by adding PRS, VC and TMSP as additives such that the amount of PRS was 0.5% by mass, the amount of VC was 0.5% by mass and the amount of TMSP was 1.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Example 12

A coin-type battery was prepared in a similar manner to Example 1, except that the non-aqueous electrolytic solution was prepared by adding PRS, VC and TMSP as additives such that the amount of PRS was 0.5% by mass, the amount of VC was 0.5% by mass and the amount of TMSP was 2.5% by mass, with respect to the total amount of the non-aqueous solution, instead of adding PRS as an additive in an amount of 0.5% by mass with respect to the total amount of the non-aqueous solution.

Using the obtained coin-type battery, evaluation of the initial characteristics and a high-temperature storage test were carried out.

Comparative Example 1

A coin-type battery was prepared in a similar manner to Example 1, except that the non-aqueous electrolytic solution was prepared without adding an additive.

Using the obtained coin-type battery, evaluation of the initial characteristics and a high-temperature storage test were carried out.

The evaluation results in Examples 1 to 12 and Comparative Example 1 are shown in Table 1.

TABLE 1

| | Additive | | | First-round efficiency [%] | First-round discharge capacity [mAh] | Discharge capacity after high-temperature storage [mAh] | Capacity retention ratio in high-temperature storage [%] |
| --- | --- | --- | --- | --- | --- | --- | --- |
| | PRS [% by mass] | VC [% by mass] | TMSP [% by mass] | | | | |
| Example 1 | 0.5 | — | — | 92.0 | 4.0 | 3.0 | 75 |
| Example 2 | 0.5 | 0.5 | — | 92.2 | 4.0 | 3.2 | 81 |
| Example 3 | 0.5 | 0.5 | 0.5 | 92.0 | 4.1 | 3.7 | 88 |
| Example 4 | 0.1 | 0.5 | 0.5 | 92.0 | 4.0 | 3.2 | 82 |
| Example 5 | 0.2 | 0.5 | 0.5 | 92.1 | 4.0 | 3.5 | 86 |
| Example 6 | 1.0 | 0.5 | 0.5 | 92.0 | 4.0 | 3.8 | 89 |
| Example 7 | 1.5 | 0.5 | 0.5 | 91.7 | 4.0 | 3.6 | 87 |
| Example 8 | 2.0 | 0.5 | 0.5 | 91.3 | 3.9 | 3.3 | 84 |
| Example 9 | 0.5 | 0.5 | 0.1 | 92.0 | 4.0 | 3.3 | 83 |
| Example 10 | 0.5 | 0.5 | 0.2 | 92.1 | 4.0 | 3.5 | 86 |
| Example 11 | 0.5 | 0.5 | 1.5 | 92.0 | 4.1 | 3.6 | 86 |
| Example 12 | 0.5 | 0.5 | 2.5 | 91.8 | 4.0 | 3.2 | 82 |
| Comparative Example 1 | — | — | — | 92.0 | 4.1 | 2.8 | 71 |

As seen from Table 1, the lithium secondary battery in which PRS was added exhibited improved high-temperature storage characteristics (Example 1), as compared with Comparative Example 1 in which an additive was not added. Further, it was confirmed that the high-temperature storage characteristics were further improved by using PRS and VC in combination (Example 2). In addition, it was confirmed that the high-temperature storage characteristics were even further improved by using PRS, VC and TMSP in combination (Examples 3 to 12).

The disclosure of Japanese Patent Application No. 2008-202863 is incorporated herein by reference.

All documents, patent applications, and technical specifications cited in the present specification are herein incorporated by reference as if each such individual document, patent application, and technical specification were specifically and individually indicated to be incorporated herein by reference.

The invention claimed is:

1. A lithium secondary battery comprising an anode, a cathode comprising a composite oxide in which at least 35% by mole of a transition metal included in the composite oxide is manganese, and a non-aqueous electrolytic solution comprising:

i) an unsaturated sultone represented by following Formula (1) in an amount of from 0.1% by mass to 7% by mass with respect to the total amount of the non-aqueous electrolytic solution:

(1)

wherein, in Formula (1), $R_1$, $R_2$, $R_3$ and $R_4$ each independently represents a hydrogen atom, a fluorine atom, or a hydrocarbon group having 1 to 12 carbon atoms that can be substituted by a fluorine atom; and n represents an integer of from 0 to 3;

ii) vinylene carbonate in an amount of from 0.5% by mass to 3% by mass with respect to the total amount of the non-aqueous electrolytic solution; and iii) a silyl phosphate derivative represented by following Formula (4) in an amount of from 0.1% by mass to 3.0% by mass with respect to the total amount of the non-aqueous electrolytic solution:

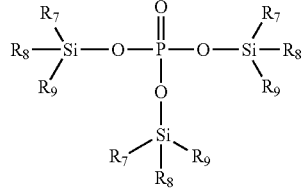
(4)

wherein, in Formula (4), $R_7$, $R_8$ and $R_9$ each independently represents an alkyl group having 1 to 6 carbon atoms.

2. The lithium secondary battery according to claim 1, wherein the anode comprises at least one selected from the group consisting of lithium metal, a lithium-containing alloy, a metal capable of forming an alloy with lithium, an alloy capable of forming an alloy with lithium, an oxide capable of being doped and capable of being dedoped with lithium ions, a transition metal nitride capable of being doped and capable of being dedoped with lithium ions, and a carbon material capable of being doped and capable of being dedoped with lithium ions.

* * * * *